(12) United States Patent
Li et al.

(10) Patent No.: US 10,637,304 B2
(45) Date of Patent: Apr. 28, 2020

(54) SINGLE PHASE PERMANENT MAGNET MOTOR AND STATOR CORE THEREOF

(71) Applicant: Johnson Electric S.A., Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 215 days.

(21) Appl. No.: 15/252,698

(22) Filed: Aug. 31, 2016

(65) Prior Publication Data
US 2017/0063175 A1 Mar. 2, 2017

(30) Foreign Application Priority Data

Sep. 1, 2015 (CN) .......................... 2015 1 0552087

(51) Int. Cl.
*H02K 1/27* (2006.01)
*H02K 1/14* (2006.01)
*H02K 21/18* (2006.01)

(52) U.S. Cl.
CPC ........... *H02K 1/143* (2013.01); *H02K 21/185* (2013.01)

(58) Field of Classification Search
CPC .. H02K 1/14; H02K 1/27; H02K 3/18; H02K 1/141; H02K 1/2706; H02K 21/14; H02K 21/185; H02K 1/143
See application file for complete search history.

(56) References Cited

U.S. PATENT DOCUMENTS

| | | | | |
|---|---|---|---|---|
| 4,066,947 A | * | 1/1978 | Nakajima | G04C 3/14 310/49.26 |
| 4,482,832 A | * | 11/1984 | Minton | H02K 17/10 310/166 |
| 5,927,249 A | * | 7/1999 | Ackermann | F02D 11/10 123/399 |
| 6,109,589 A | * | 8/2000 | Ackermann | C03C 17/25 251/129.11 |
| 6,548,922 B1 | * | 4/2003 | Takahashi | G04C 13/11 310/49.33 |
| 6,975,049 B2 | * | 12/2005 | Ionel | H02K 1/143 310/49.01 |

(Continued)

FOREIGN PATENT DOCUMENTS

CN 1304500 A 7/2001

*Primary Examiner* — Jermele M Hollington
*Assistant Examiner* — Leda T Pham
(74) *Attorney, Agent, or Firm* — Muncy, Geissler, Olds & Lowe, P.C.

(57) ABSTRACT

A single phase permanent magnet motor includes a stator core, windings wound around the stator core, and a permanent magnet rotor. The stator core includes an end portion and two spaced arm portions. Each arm portion includes a connecting arm connected to the end portion and a pole claw formed at a distal end of the connecting arm. The two pole claws define a space for receiving the rotor. The pole claws surround the space and form an arc pole surface. The arc pole surface is recessed to form a startup groove located at a central axis of the pole claw. The two pole claws are spaced apart to form two slot openings there between. A line connecting the two slot openings is orthogonal to the central axis of the pole claw.

13 Claims, 3 Drawing Sheets

(56) References Cited

U.S. PATENT DOCUMENTS

| | | | |
|---|---|---|---|
| 7,687,965 B2* | 3/2010 | Ionel | H02K 1/141 |
| | | | 310/216.001 |
| 2003/0197434 A1 | 10/2003 | Takahashi et al. | |
| 2013/0076194 A1* | 3/2013 | Benner, Jr. | H02K 33/16 |
| | | | 310/216.022 |

* cited by examiner

SINGLE PHASE PERMANENT MAGNET MOTOR AND STATOR CORE THEREOF

CROSS REFERENCE TO RELATED APPLICATIONS

This non-provisional patent application claims priority under 35 U.S.C. § 119(a) from Patent Application No. 201510552087.8 filed in The People's Republic of China on 1 Sep. 2015.

FIELD OF THE INVENTION

The present invention relates to single phase motors, and in particular to a stator core of a single phase permanent magnet motor.

BACKGROUND OF THE INVENTION

A single phase permanent magnet motor usually consists of a stator core, stator windings, and a permanent magnet rotor. The stator core is generally U-shaped, including two spaced pole arms. A pole claw is formed at a distal end of each pole arm. An inner wall surface of each pole claw is inwardly recessed to form an arc pole surface. The windings are wound around the pole arms. The rotor is disposed between the two pole claws and confronts the arc pole surface with a generally even air gap formed there between.

For facilitating startup of the rotor, the arc pole surface is inwardly recessed to form a startup groove. The startup groove is offset from a central axis of the pole claw, such that when the rotor stops rotation after motor is powered off, a pole axis of the rotor is offset from the central axis of the pole claw by an angle to form a startup angle. Under the driving of a corresponding startup circuit, the rotor can be successfully started along a specific direction when the motor is energized. However, the above single phase permanent magnet is incapable of bidirectional startup, which limits its application.

SUMMARY OF THE INVENTION

Thus, there is a desire for a single phase permanent magnet motor capable of bidirectional startup and a stator core of such motor.

In one aspect, the present invention provides a stator core including an end portion and two spaced arm portions extending from the end portion. Each arm portion includes a connecting arm connected to the end portion and a pole claw formed at a distal end of the connecting arm. Each pole claw forms an arc pole surface and the two arc pole surface define a space therein. The arc pole surface is inwardly recessed to form a startup groove located at a central axis of the pole claw. The two pole claws being spaced apart to form two slot openings there between. A line connecting the two slot openings is orthogonal to the central axis of the pole claw.

Preferably, the startup groove is symmetrical with respect to the central axis of the pole claw.

Preferably, the startup groove has a depth progressively increasing from two circumferential sides toward a center of the startup groove, and the depth has a maximum value at a location corresponding to the central axis of the pole claw.

Preferably, the arc pole surface is symmetrical with respect to the central axis of the pole claw.

Preferably, two circumferential sides of the pole claw extend outwardly to form two pole tips, opposite pole tips of the two pole claws are spaced apart so as to form said slot opening, and the slot opening has a width less than a width of a spacing between the connecting arms.

Preferably, the end portion and the arm portions are respectively formed by stacking a plurality laminations and are mechanically interconnected, one of each arm portion and the end portion forms a locking groove, the other of each arm portion and the end portion forms a locking block, and each locking block is engaged in one corresponding locking groove to connect the arm portion and the end portion.

In a second aspect, the present invention provides a single phase permanent magnet motor including a stator core; windings wound around the stator core, and a permanent magnet rotor rotatably disposed in the stator core. The stator core includes an end portion and two spaced arm portions extending from the end portion. Each arm portion includes a connecting arm connected to the end portion and a pole claw formed at a distal end of the connecting arm. Each pole claw forms an arc pole surface and the two arc pole surface define a space therein. The arc pole surface is inwardly recessed to form a startup groove located at a central axis of the pole claw. The two pole claws being spaced apart to form two slot openings there between. A line connecting the two slot openings is orthogonal to the central axis of the pole claw. The arc pole surface of the stator core surrounding the rotor with an air gap formed between the arc pole surface and the rotor.

DETAILED DESCRIPTION OF THE PREFERRED EMBODIMENTS

Figure 1:
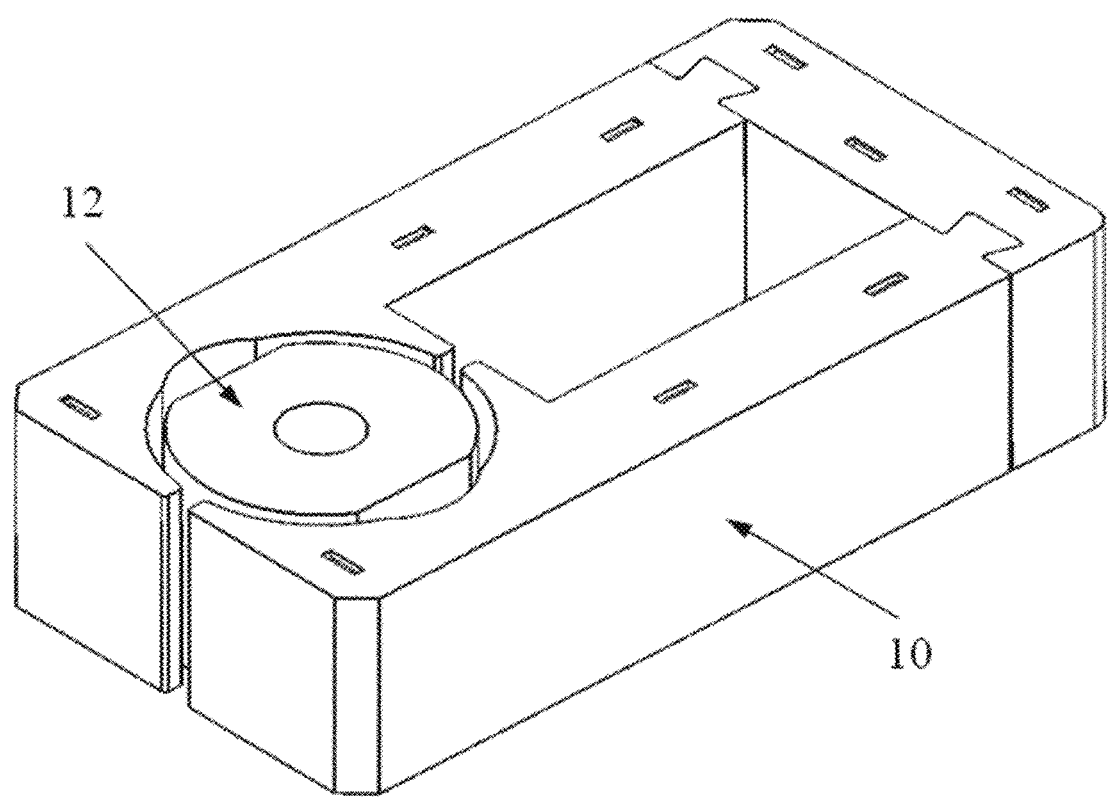
FIG. 1 illustrates a single phase permanent magnet motor according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

FIG. 1 illustrates a single phase permanent magnet motor according to one embodiment of the present invention. The motor includes a stator core 10, windings (not shown) wound around the stator core 10, and a permanent magnet rotor 12 rotatably disposed in the stator core 10. In the figures, for the sake of clearly showing the structure and features of the stator core 10 of the motor of the present invention, some parts of the motor, such as the windings, a circuit for controlling the current of the windings, a motor housing or the like, are not shown, which can be constructed as in a known single phase permanent magnet motor. A rotary shaft may fixedly pass through the permanent magnet rotor 12 for connecting with a load. Upon the windings being energized, the stator core 10 is polarized which interacts with the magnetic field of the permanent magnet rotor 12 to push the permanent magnet rotor 12 to rotate, which in turn drives the load to operation.

Figure 2:
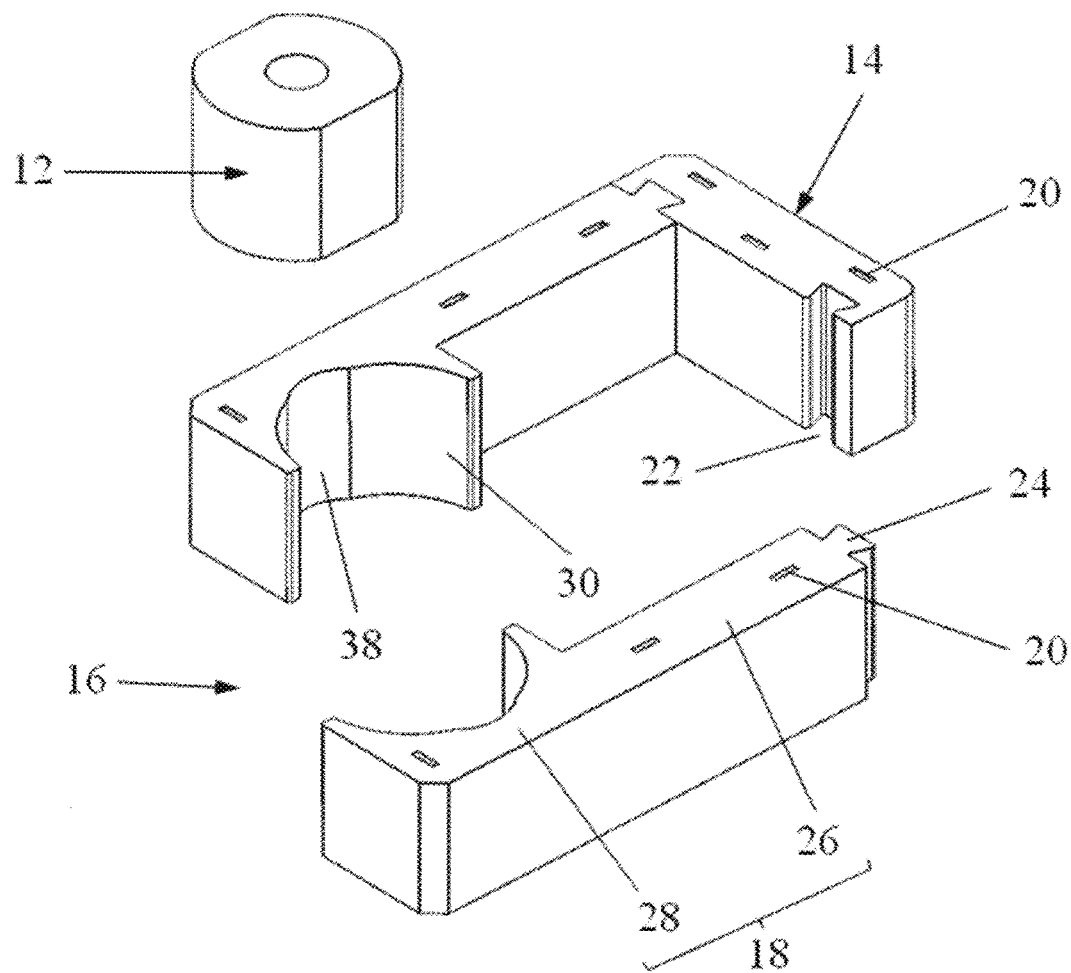
FIG. 2 is an exploded view of the motor of FIG. 1.

The stator core 10 may be made of a soft magnetic material such as ferrite. Preferably, as shown in FIG. 2, in the present embodiment, the stator core 10 is a U-shaped stator core including an end portion 14 and a pole arm 16 perpendicularly extending outwardly from the end portion 14. In this embodiment, the pole arm 16 includes two separate arm portions 18. The two arm portions 18 are spaced from and disposed in parallel with each other, with a space formed there between for facilitating the winding of the windings. In this embodiment, the end portion 14 and the two arm portions 18 of the pole arm 16 are separately formed and then connected together through mechanical connections. As such, the windings can be respectively wound around the arm portions 18 before the arm portions 18 are connected to the end portion 14, which makes the winding process easier and more convenient. Preferably, each of the end portion 14 and the two arm portions 18 is made by stacking a plurality of laminations such as silicon steel sheets. The figures only show the overall shapes of the end portion 14 and the arm portions 18 after the laminations are stacked, without showing specific structures of the multiple stacked layers.

For facilitating the assembly of the laminations, each lamination is formed with a corresponding assembly hole 20. In this embodiment, the assembly hole 22 is a recessed blind hole and the lamination has a protrusion corresponding to the blind hole. During stacking the laminations, the protrusion of one lamination is engaged in the assembly hole of an adjacent lamination so as to form a mechanical connection there between. The end portion 14 and the arm portions 18 are respectively formed by the methods.

In this embodiment, the end portion 14 forms two locking grooves 22 at locations adjacent two sides thereof. End faces of the two arm portions 18 toward the end portion 14 project outwardly to form locking blocks 24, respectively. The locking blocks 24 of the two arm portions 18 are respectively inserted into the locking grooves 22 along the axial direction to connect the arm portions 18 with the end portion 14, thus forming the stator core 10. Preferably, the locking blocks 24 is dovetail shaped and the locking groove 22 has a shape matching the locking block 24, so that the connection between the locking block 24 and the locking groove 22 is strengthened, to avoid disengagement there between. In another embodiment, the locking grooves 22 may be formed in the arm portions 18, the locking blocks 24 are correspondingly formed on the end portion 14, and the arm portions 18 and the end portion 14 likewise are connected together to form the stator core 10.

The two arm portions 18 of the pole arm 16 have substantially symmetrical construction. Each arm portion 18 is elongated, including a connecting arm 26 connected with the end portion 14 and a pole claw 28 formed at a distal end of the connecting arm 26. The connecting arms 26 of the two arm portions 18 are disposed in parallel with each other and are spaced apart by a space. The two pole claws 28 are opposed to and spaced from each other. Opposed inner wall surfaces of the two pole claws 28 are recessed to form arc pole surfaces 30. The arc pole surfaces 30 define a receiving space 32 for receiving the rotor 12 therein. The receiving space 32 is generally in the form of an unclosed cylinder coaxial with the rotor 12. The receiving space 32 has a diameter slightly greater than a diameter of the rotor 12. As a result, the arc pole surface 30 is spaced a small radial distance from an outer surface of the rotor 12, thereby forming a generally even air gap between the rotor 12 and the arc pole surface 30 of the stator core.

In this embodiment, each pole claw 28 is generally C-shaped, two circumferential sides of which project laterally outwardly relative to the connecting arm 26 to form pole tips 34, respectively. The pole tips 34 are generally parallel to the end portion 14 and are located in the space between the two connecting arms 26. Preferably, an extending length of the pole tip 34 is less than a half of a width of the spacing between the connecting arms 26. As such, after assembly of the arm portions 18, the pole tips 34 of the two pole claws 28 are opposed to each other with a small slot opening 36 formed between the two corresponding opposite pole tips 34, which causes the arc pole surface 30 to be discontinued along the circumferential direction. Preferably, the slot opening 36 is located to face a middle of the space the two connecting arms 26. Preferably, the width of the slot opening 36 is less than three times of the width of the air gap between the arc pole surface 30 and the rotor 12. More preferably, the width of the slot opening 36 is less than two times of the width of the air gap between the arc pole surface 30 and the rotor 12, which reduces the cogging torque while reducing the magnetic leakage as much as possible, thereby ensuring the efficiency of the motor and reducing noise.

Figure 3:
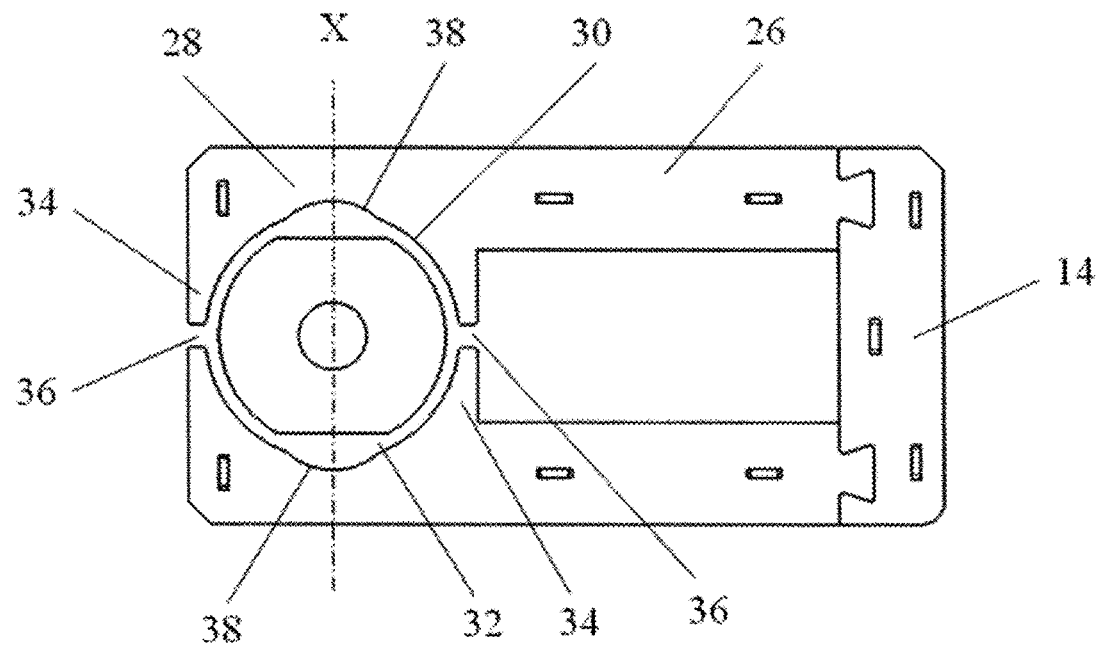
FIG. 3 is a top view of the motor of FIG. 1.

Referring also to FIG. 3, the arc pole surface 30 is recessed inwardly to form two startup grooves 38 located respectively on the two pole claws 28. Each startup groove 38 is located at a center of the corresponding pole claw 28 along the circumferential direction. The startup groove 38 is of an axis-symmetrical structure having an axis of symmetry coincident with a central axis X of the pole claws 28. The startup groove 38 has a depth gradually increasing from two circumferential sides toward the center thereof. The maximum depth of the startup groove 38 is at a location corresponding to the central axis X. Because the arc pole surface 30 is inwardly recessed to form the startup grooves 38, the air gap between the stator core 10 and the rotor 12 at the areas of the startup grooves 38 is uneven, and the air gap has a greatest width at the location of the startup groove 38 corresponding to the central axis X of the pole claw 28. Therefore, in this disclosure, the substantially even air gap formed between the arc pole surface 30 and the outer surface of the rotor 12 refers to the substantially even air gap formed between the rotor 12 and the arc pole surface 30 excluding the arc pole surface portion with the startup grooves 38 formed thereon.

In this embodiment, the startup groove 38 is disposed at the central axis X of the pole claw 28, and a maximum air gap is formed at the location corresponding to the central axis X. When the motor is powered off and the rotor stops rotation, a center line of the rotor 12 is coincident with the central axis X of the stator pole, and the magnetic pole of the rotor 12 is aligned with the pole tip 34 of the pole claw 28, thereby forming a startup angle of 90 degrees. When the motor is to be started again, the rotor 12 can be rotated clockwise or counterclockwise. That is, the motor is capable of quick bidirectional startup, which is particularly suitable for applications do not require specific rotation direction.

Preferably, the single phase permanent magnet motor is a single phase permanent magnet brushless synchronous motor, which is particularly suitable for use in a drain pump or a circulation pump of a home appliance such as a clothes washing machine or a dish washer.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single phase permanent magnet motor comprising:
   a stator core is a U-shaped stator core, comprising:
      an end portion, and
      two spaced arm portions extending perpendicularly from the end portion, each arm portion comprising a connecting arm connected to the end portion and a pole claw formed at a distal end of the connecting arm, the two arm portions spaced from and disposed in parallel with each other, with a space formed there between for facilitating windings, each pole claw forming an arc pole surface and the two arc pole surface define a space therein, the arc pole surface being inwardly recessed to form a startup groove located at a central axis of the pole claw, the startup groove being an empty groove, the two pole claws being spaced apart to form two slot openings there between, a line connecting the two slot openings being orthogonal to the central axis of the pole claw, the windings wound around the connecting arms, and a permanent magnet rotor rotatably disposed in the space in the two pole claws, the arc pole surface of the stator core surrounding the rotor with an air gap formed between the arc pole surface and the rotor, wherein when the windings are not energized, a center line of the rotor is coincident with the central axis of the pole claw, and a magnetic pole of the rotor is aligned with a pole tip of the pole claw, thereby forming a startup angle of 90 degrees.

2. The single phase permanent magnet motor of claim 1, wherein the arc pole surface is spaced from a center of the rotor with a constant distance except at the area of the startup groove.

3. The single phase permanent magnet motor of claim 1, wherein the startup groove is symmetrical with respect to the central axis of the pole claw.

4. The single phase permanent magnet motor of claim 1, wherein the startup groove has a depth progressively increasing from two circumferential sides toward a center of the startup groove, and the depth has a maximum value at a location corresponding to the central axis of the pole claw.

5. The single phase permanent magnet motor of claim 1, wherein the arc pole surface is symmetrical with respect to the central axis of the pole claw.

6. The single phase permanent magnet motor of claim 1, wherein two circumferential sides of the pole claw extend outwardly to form two pole tips, opposite pole tips of the two pole claws are spaced apart so as to form said slot opening, and the slot opening has a width less than a width of a spacing between the connecting arms.

7. The single phase permanent magnet motor of claim 1, wherein the end portion and the arm portions are respectively formed by stacking a plurality laminations and are mechanically interconnected, one of each arm portion and the end portion forms a locking groove, the other of each arm portion and the end portion forms a locking block, and each locking block is engaged in one corresponding locking groove to connect the arm portion and the end portion.

8. The single phase permanent magnet motor of claim 1, wherein the end portion and the arm portions are formed by stacking a plurality of laminations, each lamination is formed with a corresponding assembly hole, the assembly hole is a recessed blind hole and the lamination has a protrusion corresponding to the blind hole, during stacking the laminations, the protrusion of one lamination is engaged in the assembly hole of an adjacent lamination so as to form a mechanical connection there between.

9. The single phase permanent magnet motor of claim 1, the width of the slot opening is less than three times of the width of the air gap between the arc pole surface and the rotor.

10. A stator core comprising:

an end portion; and two spaced arm portions extending perpendicularly from the end portion, each arm portion comprising a connecting arm connected to the end portion and a pole claw formed at a distal end of the connecting arm, the two arm portions spaced from and disposed in parallel with each other, with a space formed there between for facilitating windings, each pole claw forming an arc pole surface and the two arc pole surface define a space therein, the arc pole surface being inwardly recessed to form a startup groove located at a central axis of the pole claw, the startup groove being an empty groove, the two pole claws being spaced apart to form two slot openings there between, a line connecting the two slot openings being offset from the central axis of the pole claw, wherein the arc pole surface is symmetrical with respect to the central axis of the pole claw.

11. The stator core of claim 10, wherein the startup groove is symmetrical with respect to the central axis of the pole claw.

12. The stator core of claim 10, wherein the startup groove has a depth progressively increasing from two circumferential sides toward a center of the startup groove, and the depth has a maximum value at a location corresponding to the central axis of the pole claw.

13. The stator core of claim 10, wherein two circumferential sides of the pole claw extend outwardly to form two pole tips, opposite pole tips of the two pole claws are spaced apart so as to form said slot opening, and the slot opening has a width less than a width of a spacing between the connecting arms.

* * * * *